United States Patent [19]

Sato et al.

[11] Patent Number: 4,486,786
[45] Date of Patent: Dec. 4, 1984

[54] ORIGINAL READING DEVICE

[75] Inventors: Tadashi Sato, Kokubunji; Haruo Tsunoi, Kawasaki, both of Japan

[73] Assignee: Canon Kabushiki Kaisha, Tokyo, Japan

[21] Appl. No.: 413,988

[22] Filed: Sep. 2, 1982

[30] Foreign Application Priority Data

Sep. 8, 1981 [JP] Japan ................................ 56-141323
Sep. 8, 1981 [JP] Japan ................................ 56-141324
Oct. 9, 1981 [JP] Japan ............................ 56-15078[U]

[51] Int. Cl.³ ............................................. H04N 1/10
[52] U.S. Cl. .................................... 358/293; 358/285; 358/294
[58] Field of Search ................ 358/256, 285, 293, 294

[56] References Cited

U.S. PATENT DOCUMENTS

| | | | |
|---|---|---|---|
| 3,413,411 | 11/1968 | Stauffer | 358/256 |
| 3,602,639 | 8/1971 | Alden | 358/285 |
| 3,614,313 | 10/1971 | Alden | 358/285 |
| 3,739,095 | 6/1973 | Alden | 358/294 |
| 3,752,558 | 8/1973 | Lloyd | 358/293 |
| 3,886,309 | 5/1975 | Mason | 358/293 |
| 3,911,213 | 10/1975 | Tregay | 358/294 |
| 4,275,423 | 6/1981 | Takahashi | 358/293 |
| 4,421,403 | 12/1983 | Sato et al. | 355/8 |

Primary Examiner—Howard W. Britton
Attorney, Agent, or Firm—Fitzpatrick, Cella, Harper & Scinto

[57] ABSTRACT

An original reading device has an original table for supporting thereon an original with its surface to be read facing upward, a retention plate for retaining the original, and a scanning head movable along the retention plate in a minor scanning direction. The scanning head contains therein an optical system including a lens, and an image sensing element for scanning the surface to be read of the original in a major scanning direction. The retention plate is vertically movable in accordance with the thickness of the original. The scanning head is vertically movable to maintain the length of the optical path between the surface to be read and the lens constant even if the thickness of the original is large, and the scanning head is provided with a spacer which bears against the retention plate.

18 Claims, 10 Drawing Figures

ORIGINAL READING DEVICE

BACKGROUND OF THE INVENTION

1. Field of the Invention

This invention relates to an original reading device in a facsimile, a digital copying apparatus, an image editing apparatus or the like. More particularly, it relates to improvements in the mechanism of a device which reads the image of an original and generates an electrical signal corresponding to the image.

2. Description of the Prior Art

A usual original reading device is designed such that an original is placed on an original table with the surface to be read thereof facing downward and the original is scanned from below the original table. However, such a device involves the cumbersome operation of covering the portion of the original which need not be read with a masking sheet or superposing a plurality of originals one upon another for synthetic reading.

An original reading device of the type in which an original is placed on an original table with the surface to be read facing upward is disclosed in German Pat. No. 30 20 258. In the device disclosed in this German patent, the original is pressed against the original table by an original keep or retention plate having a transparent plate and the surface to be read of the original is scanned from above the retention plate by the use of a mirror. The original table is formed of a cushion material having elasticity so that when a thick original such as a book or the like is placed on the original table, the original table is elastically depressed to ensure that the surface to be read is kept at a predetermined level. However, even if such an elastic original table is used, if the thickness of the original further increases, the level of the surface to be read becomes higher than the predetermined level and the original retention plate and the scanning mirror become inclined relative to the surface to be read, which makes accurate reading impossible, or the length of the optical path between the surface to be read and the lens varies, also making accurate reading impossible.

SUMMARY OF THE INVENTION

It is an object of the present invention to provide an original reading device which overcomes the above-noted disadvantages peculiar to the device according to the prior art.

It is another object of the present invention to provide an original reading device which is capable of accurately reading the information of the surface to be read of an original even if the position of that surface is high.

It is still another object of the present invention to provide an original reading device which is capable of accurately scanning the surface to be read even if the position of that surface is high.

Other objects and features of the present invention will become apparent from the following detailed description thereof taken in conjunction with the accompanying drawings.

DESCRIPTION OF THE PREFERRED EMBODIMENTS

Figure 1:
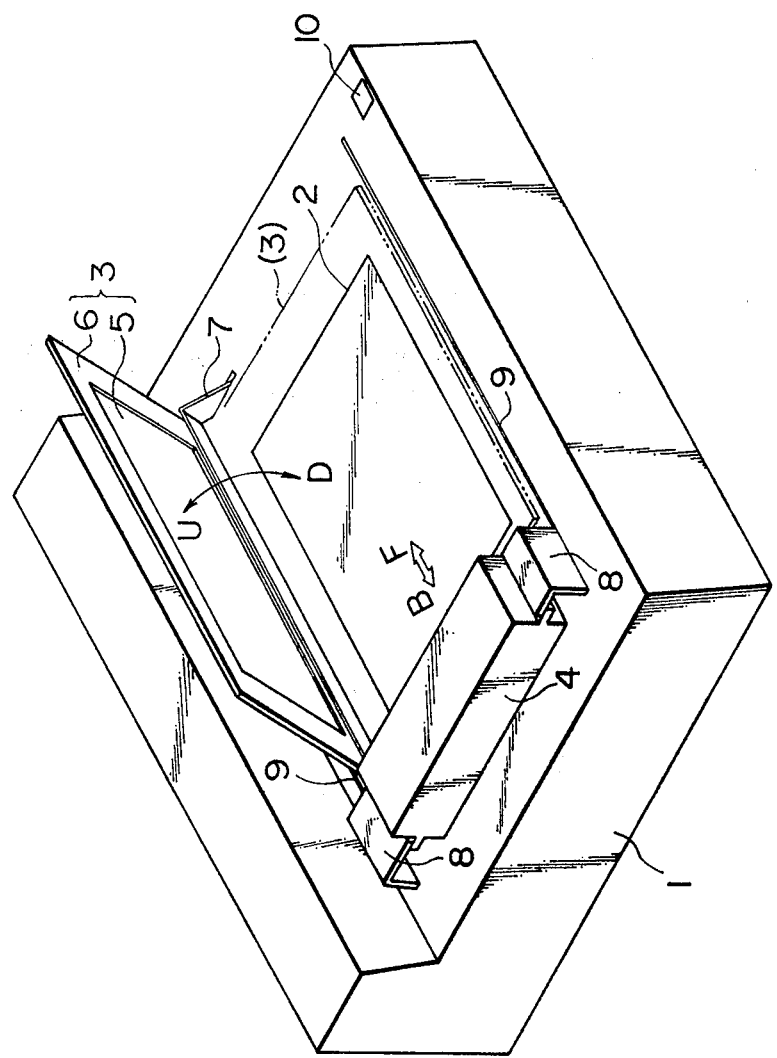
FIG. 1 is a pictorial view of an embodiment of the present invention.

Referring to FIG. 1, an original table 2 is provided on top of a body housing 1. The original table 2 is of a flexible elastic material such as sponge rubber. An original 0 is placed on the upper surface of the original table 2 with its surface to be read facing upward. An original retention plate 3 is pivotable about an axis to be described in the direction of arrow D-U. Pivoting the plate 3 in the direction of arrow U is referred to in the specification and claims hereof as opening the plate 3 with respect to the original table 2, and pivoting the plate 3 in the direction of arrow D is referred to in the specification and claims hereof as closing the plate 3 with respect to the original table 2. Such pivotal movement of the plate 3 is manually accomplished by the operator. Alternatively, an automatic opening-closing device may be provided.

The original retention plate 3 has a transparent glass flat plate 5 and a frame member 6 to which the glass flat plate 5 is fixed. When the retention plate 3 is closed with respect to the table 2 as indicated by dots-and-dash line (3), the glass flat plate 5 uniformly intimately contacts the entire surface to be read of the original 0 placed on the original table 2, thereby ensuring that the original 0 is held on the table 2. Where the original 0 is a thick original such as a book or the like, the original table 2 is compressed and deformed by the weight of the original itself and by the original being pressed from above by the retention plate 3, whereby the thickness of the original table becomes smaller. That is, the original 0 sinks and the level of its surface to be read becomes low as compared with a case where the table 2 is of a hard material. Accordingly, up to a certain degree of thickness of the original, the level of its surface to be read can be kept at a predetermined level (standard level), but if the thickness of the original exceeds the compressive deformation limit of the original, the level of the surface to be read will be higher than the standard level even though the original is pressed by the retention plate 3.

A scanning head 4 assumes the position of FIG. 1 (home position) during down-time of the device or when the retention plate is opened and closed with respect to the table 2 to place an original on the table 2. When in the home position, the scanning head 4 lies at a position displaced from the original retention plate 3 closed with respect to the table 2 and does not mechanically interfere with the opening-closing operation of the retention plate. After the original has been placed on the table 2 and the retention plate 3 has been pivoted in the direction of arrow D to be pressed against the original 0, a reading instruction key 10 is depressed, whereupon the head 4 is moved in a minor scanning direction F. During this movement, the original 0 is read. When the reading of the original is terminated, the head 4 is moved in a direction B which is opposite to the direction F and returns to the home position.

Figure 2:
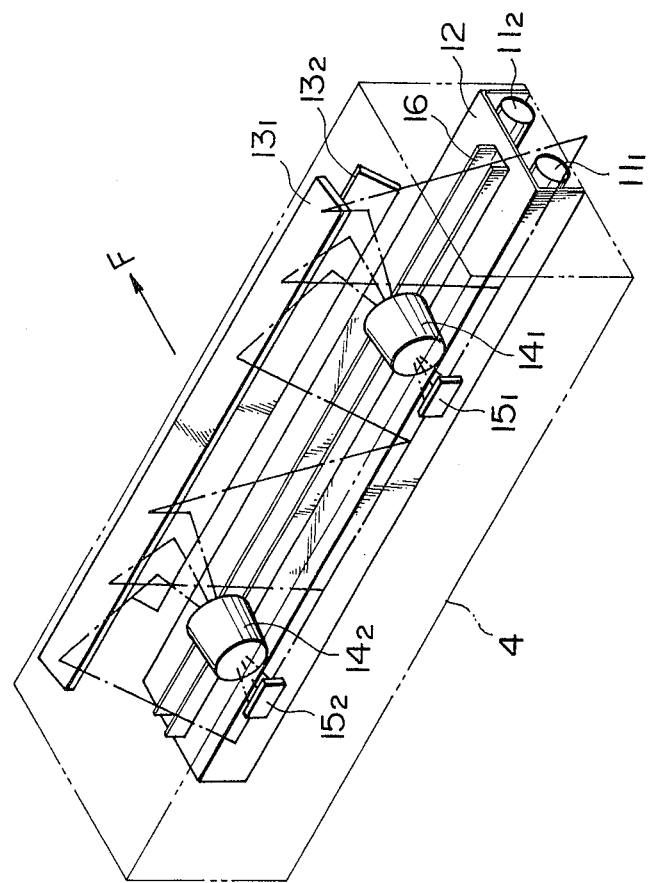
FIG. 2 illustrates the interior of a scanning head.

Within the head 4, as shown in FIG. 2, there are fixed original illuminating lamps $11_1$, $11_2$, a reflecting plate 12, mirrors $13_1$, $13_2$, lenses $14_1$, $14_2$, and photoelectric conversion elements such as charge coupled devices (CCD) $15_1$, $15_2$. The head 4 is moved in the direction of arrow F along a path above the glass plate 5 while being opposed to the surface to be read of the original 0 placed on the original table as previously described, with the glass plate 5 of the keep plate 3 interposed therebetween. During this movement, the surface to be read of the original is illuminated by the lamps $11_1$, $11_2$ and reflecting plate 12. The light from the surface to be read which is so illuminated passes through a slit provided in the reflecting plate 12 and is reflected by the mirrors $13_1$ and $13_2$ in succession and passes through the lenses $14_1$ and $14_2$ to the CCDs $15_1$ and $15_2$. The lens $14_1$ images on the CCD $15_1$ the right one-half area of the width of the original with respect to a direction perpendicular to the minor scanning direction F, namely, a major scanning direction, and the lens $14_2$ images the left one-half area on the CCD $15_2$. The CCDs $15_1$ and $15_2$ one-dimensionally line-scan the image of the surface to be read of the original in the major scanning direction. Thus, during the scanning of the original, the CCDs $15_1$ and $15_2$ generate electrical signals corresponding to the image. These electrical signals are once stored in a conventional memory device and are then used for the reproduction of the image or are immediately transmitted to an image reproducing device.

In the example shown, two solid state image sensing elements CCDs are used, but the number of solid state image sensing elements CCDs is set by the relation between the bit number of the solid state image sensing elements CCDs and the resolving power which is to be used in reading the image. Assuming that the specific bit number of the solid state image sensing elements CCDs is N, that the number of the solid state image sensing elements CCDs is n, that the width to be read of the image original is B and that the resolving power is R, n is determined so that the relation that $N \times n \geq B \times R$ is established. In the example shown, assuming that the specific bit number of the solid state image sensing elements CCDs is 1728 bits, that the number of the solid state image sensing elements is 2, that the width (257 mm) of an original of JIS B4 size (257 mm × 364 mm) is to be primarily scanned and that the resolving power is 12 pel, $1728 \times 2 \geq 257 \times 12$ $3456 \geq 3084$ and this device is set so that the relation as mentioned above is established. In any case, the head 4 can be made compact by using a plurality of lenses and giving the lenses charge of different sections of the original.

As the photoelectric conversion elements, image pick-up tubes or the like may be employed besides CCDs.

Leg members 8 are fixed to the head 4. The leg members 8 extend into the outer housing 1 through slits 9 formed in the outer housing 1. The leg members 8 are movable along the slits 9.

Figure 3:
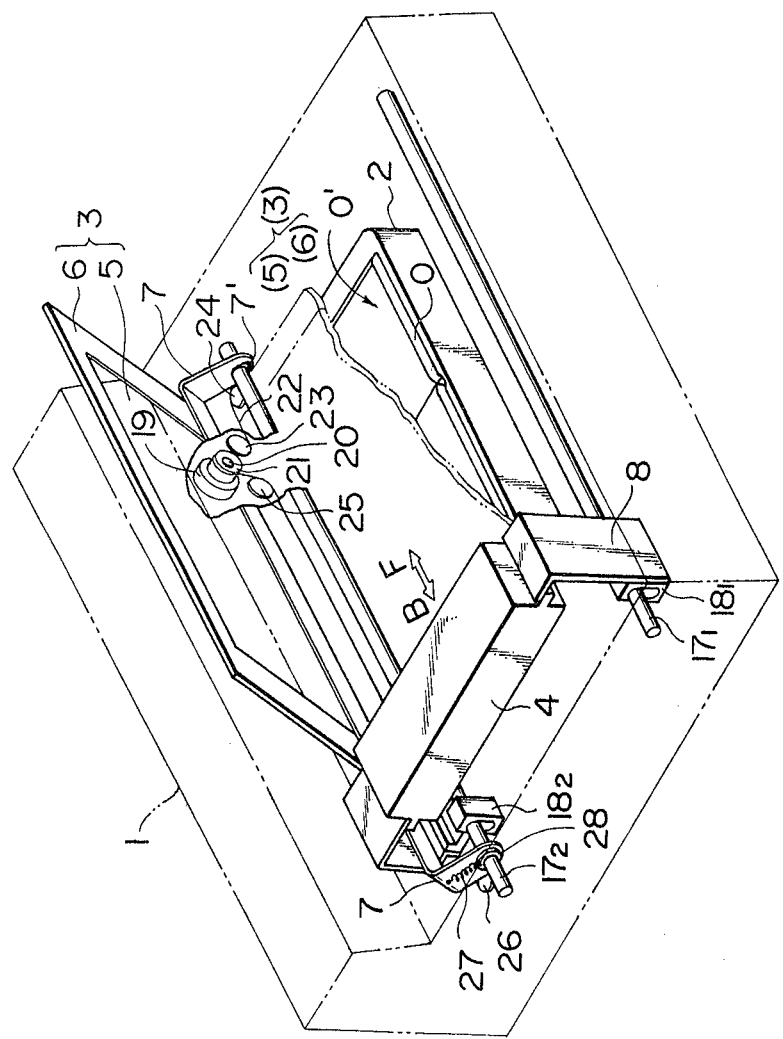
FIG. 3 illustrates a mechanism in the outer housing with a part thereof broken away.

Referring now to FIG. 3, guide rails $17_1$ and $17_2$ elongated in a direction parallel to the minor scanning direction are fixed within the housing 1. Bearings $18_1$ and $18_2$ fixed to the leg members of the scanning head 4 are slidably fitted on the rails $17_1$ and $17_2$. Thus, the head 4 is movable in direction F and direction B under the guidance of the rails $17_1$ and $17_2$.

The driving system of the scanning head 4 will now be described. A wire drum 21 is secured to the shaft 20 of a drive motor 19 which is rotatable in both forward and reverse directions, and wire 22 is wound on the wire drum. The wire 22 has one end thereof connected to the lower portion of one bearing $18_2$ via pulleys 23 and 24 rotatably mounted on a shaft secured in place within the housing 1. Likewise, the wire 22 has the other end thereof connected to the lower portion of the bearing $18_2$ via pulleys 25 and 26 rotatably mounted on a shaft secured in place within the housing 1. Accordingly, when the wire drum 21 is rotated clockwise, the scanning head 4 pulled by the wire 22 is moved in the direction of arrow F. When the head 4 scans a predetermined length of the original, the drive motor 19 is rotated in reverse direction by a sensor, not shown, so that the wire drum 21 is rotated counter-clockwise and the scanning head 4 is moved in the direction of arrow B and stopped at the home position by another sensor, not shown.

Figure 4:
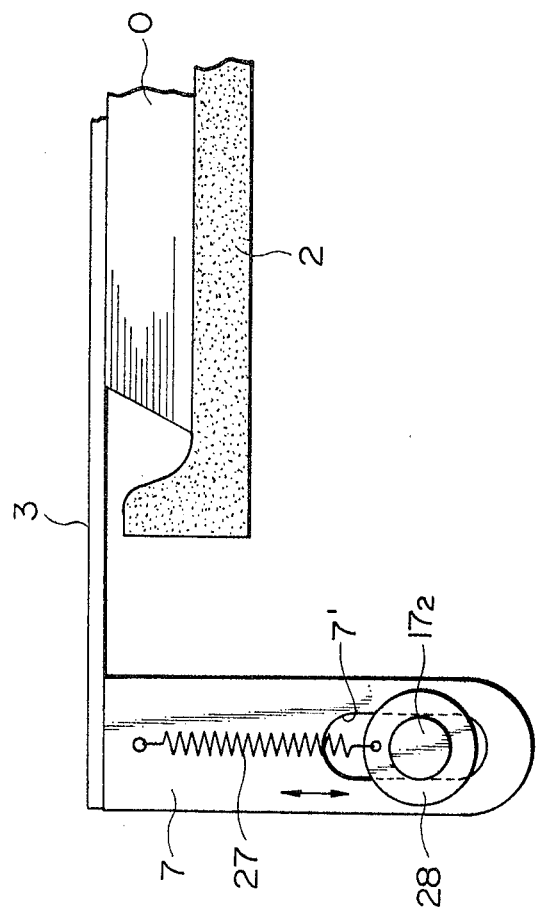
FIG. 4 illustrates the leg portion of an original retention plate.

As previously described, if the original 0 is insufficiently thick, the level of the surface 0' to be read is higher than the standard level. In such a case, the retention plate 3 must be raised in accordance with the thickness of the original 0 in order that the glass plate 5 of the retention plate 3 may be uniformly pressed against the entire surface to be read of the original 0. For this purpose, the retention plate 3 is supported in the following manner. Leg members 7 are fixed to the frame member 6 of the retention plate 3. Each of the leg members 7 is provided with a slot 7' as shown in FIG. 4, and a rail $17_2$ is fitted in the slot 7'. Accordingly, the retention plate 3 is pivotable in directions U and D with the rail $17_2$ as the axis, as previously noted. Each of the leg members 7 is formed with a small aperture in which one end of a tension spring 27 is retained. The other end of the tension spring 27 is retained in a small aperture formed in a ring 28 fitted on the rail $17_2$. Thus, the spring 27 resiliently pulls the retention plate 3 in a direction to reduce the distance between the base of the retention plate 3 and the rail $17_2$. Since, however, the slot 7' engaged with the rail $17_2$ is elongate, the retention plate 3 is movable up and down. That is, the pressure contact position of the retention plate 3 with respect to the surface to be read of the original 0 is movable up and down in accordance with the thickness of the original. Thus, the retention plate 3 is mounted pivotably relative to the rail $17_2$ and vertically movably and can pivot without back-lash with the aid of the action of the spring 27. The spring 27 may be omitted.

As described above, the position of the surface to be read of the original is vertically varied in accordance with the thickness of the original. To maintain the length of the optical path between the surface to be read and the lenses $14_1$, $14_2$ constant irrespective of the position of the surface to be read, the scanning head 4 is also movable up and down.

Figure 5:
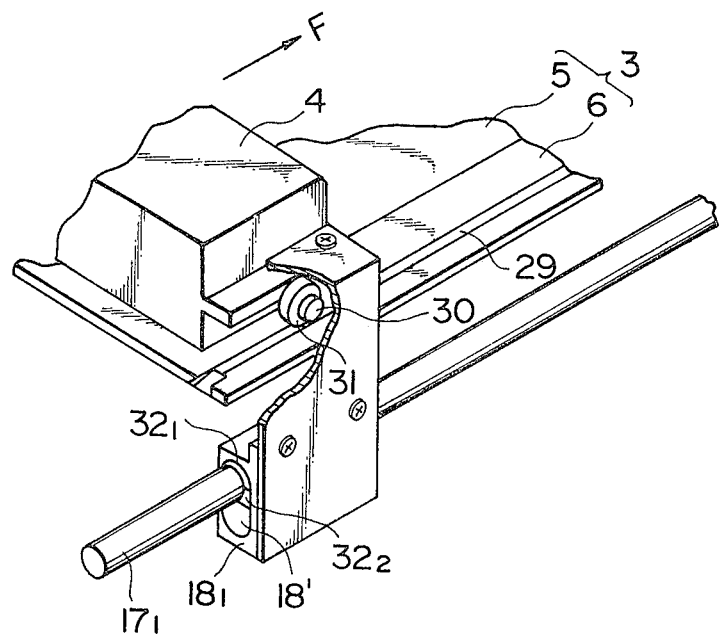
FIG. 5 is an illustration of the essential portions of the device for explaining the relation between the scanning head and the original retention plate.

A shaft 30 is studded in the vertically movable head 4, as shown in FIG. 5, and a spacer roller 31 is rotatably mounted on the shaft 30. The roller 31 rolls on a guide path 29 provided in the frame member 6 of the retention plate 3. The guide path 29 is elongated in a direction parallel to the minor scanning direction F and is parallel to the guide rails $17_1$, $17_2$ and the glass plate 5. Accordingly, the head 4 moves parallel to the glass plate 5, or in other words, parallel to the surface to be read. That is, during the time the scanning head 4 moves in the direction of arrow F above the glass plate 5, the length of the optical path between the lenses $14_1$, $14_2$ and the surface to be read of the original is maintained constant. In FIG. 5, the spacer roller 31 and guide path 29 on this side of the head 4 are shown, but a similar spacer roller and guide path are also provided on the inner side of the head 4.

Figure 6:
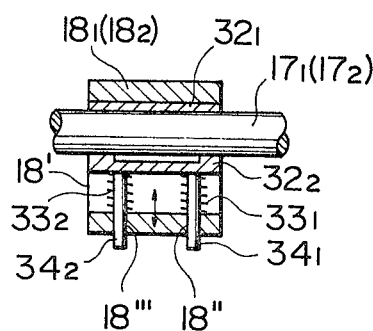
FIG. 6 is a cross-sectional view of an example of the bearing portion.

Now, the guide rails $17_1$ and $17_2$ are fixed in place. Accordingly, the head 4 must be moved up and down relative to the rails $17_1$ and $17_2$. In other words, bearing bodies $18_1$ and $18_2$ are engaged for vertical movement relative to the rails $17_1$ and $17_2$. In FIG. 6, an upper bearing $32_1$ and a lower bearing $32_2$ are provided in the slots 18' of the bearing bodies $18_1$ and $18_2$. The upper bearing $32_1$ which is in slidable contact with the upper portion of the rails $17_1$, $17_2$ is fixed to the bearing bodies $18_1$, $18_2$, and the lower bearing $32_2$ which is in slidable contact with the lower portion of the rails $17_1$, $17_2$ is vertically movable in the slot 18'. Guide pins $33_1$ and $33_2$ are studded inn the lower bearing $32_2$ and loosely inserted in guide holes 18" and 18'" formed in the bearing bodies $18_1$ and $18_2$. Compression springs $33_1$ and $33_2$ are provided around the pins $33_1$ and $33_2$ and the bearing bodies $18_1$ and $18_2$ are resiliently biased downwardly by these springs. Thus, when the keep plate 3 becomes higher than the standard level and the head 4 is raised upward, the bearing bodies $18_1$ and $18_2$ are also raised by the same amount as the head 4 while compressing the springs $33_1$ and $33_2$. In this condition, the upper bearing $32_1$ is spaced apart from the rails $17_1$ and $17_2$, but the lower bearing $32_2$ is resiliently forced into contact with the rails $17_1$ and $17_2$ by the springs $33_1$ and $33_2$, so that the head 4 is reliably guided by the rails $17_1$ and $17_2$.

In the above-described example, the guide rails $17_1$ and $17_2$ are fixed in place. In the following example, the guide rails $17_1$ and $17_2$ are vertically movable in accordance with the thickness of the original.

Figure 7:
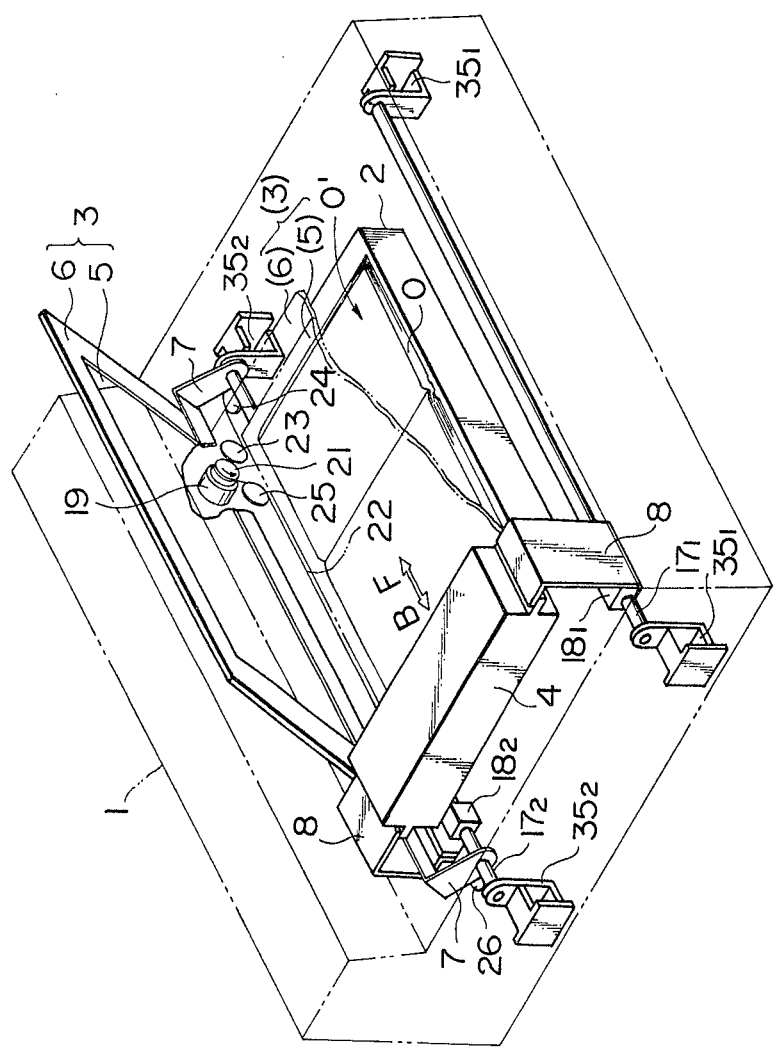
FIG. 7 illustrates another embodiment of the present invention.

Referring to FIG. 7, the leg members 7 of the retention plate 3 have ordinary round holes and a round bar rail $17_2$ is fitted for rotation relative to these round holes. That is, the retention plate 3 is pivotable in the directions U and D with the rail $17_2$ as the axis.

Bearings $18_1$ and $18_2$ also have ordinary round holes, and round bars $17_1$ and $17_2$ are relatively slidably fitted in these round holes. Accordingly, in the example of FIG. 7, the bearings $18_1$, $18_2$ and thus the scanning head 4 does not vertically move relative to the rails $17_1$ and $17_2$.

Figure 8:
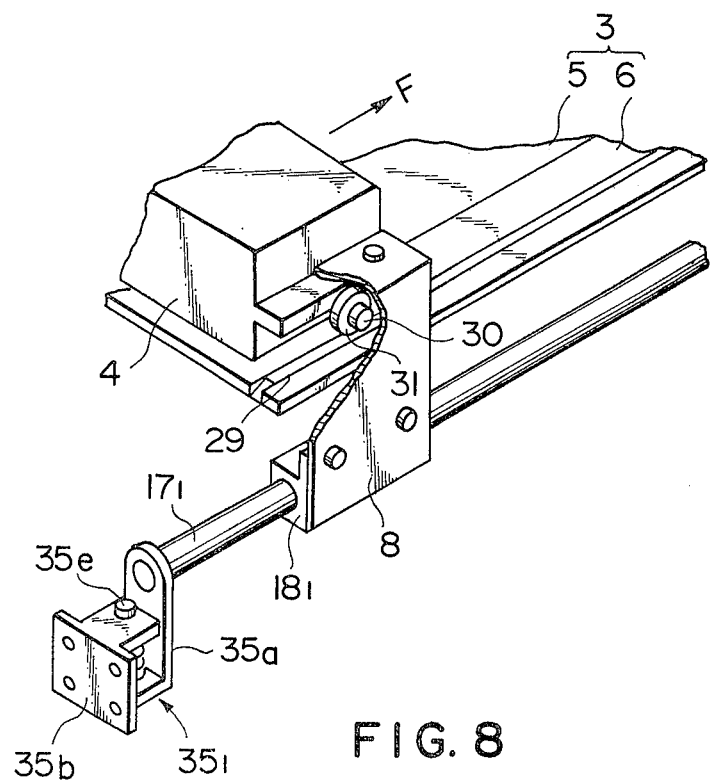
FIG. 8 illustrates the essential portions of the device.
Figure 9:
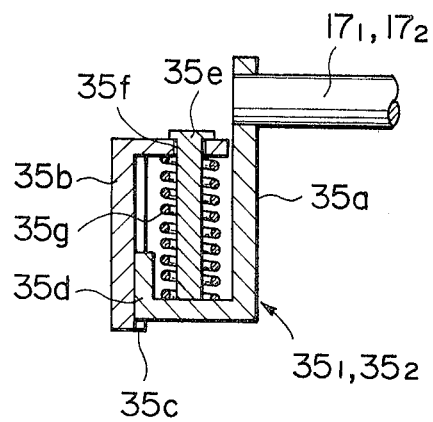
FIG. 9 is a cross-sectional view of an example of the movable rail supporting means.
Figure 10:
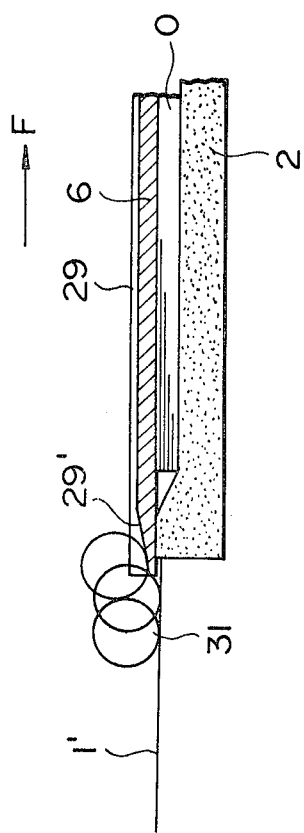
FIG. 10 illustrates an example of the spacer roller guide path.

The rails $17_1$ and $17_2$ are supported by rail supporting means $35_1$ and $35_2$, respectively. As shown in FIGS. 8 and 9, the rail supporting means $35_1$ and $35_2$ each have a movable member $35_a$ to which the rail $17_1$, $17_2$ is fixed, and a fixed member $35_b$ fixed to the outer housing 1. The fixed member $35_b$ is provided with a guide groove $35_c$ in which the handle $35_d$ of a movable member $35_a$ is slidably fitted. Thus, the member $35_a$ is vertically movable relative to the member $35_b$. In other words, the rails $17_1$ and $17_2$ are vertically movable. A guide bar $35_e$ is studded upright in the movable member $35_a$ and slidably inserted in a hole $35_f$ provided in the fixed member $35_b$. A compression spring $35_g$ is interposed between the movable member $35_a$ and the fixed member $35_b$. The spring $35_g$ biases the movable member $35_a$ downwardly, whereby the rails $17_1$ and $17_2$ are stably held at a level corresponding to the thickness of the original. The spring $35_g$ may be omitted as the case may be.

Thus, in the device of FIGS. 7, 8 and 9, the guide rails $17_1$ and $17_2$ for guiding the reciprocal movement of the scanning head 4 in the minor scanning direction are vertically movable, whereby the scanning head 4 is vertically movable in accordance with the thickness of the original.

In the above-described examples, when the scanning head 4 is in its home position, the spacer roller 31 rests on the upper surface 1' of the outer housing 1. Accordingly, in this condition, the level of the head 4 is fixed irrespective of the thickness of the original. The level of the head 4 becomes higher by the roller 31 riding onto the retention plate 3 after the head 4 starts to move in the direction F. In order that the roller 31 may smoothly ride onto the retention plate 3 at this time, the entrance portion 29' of the guide path 29 is formed into a sloped surface 29' which gradually becomes higher along the direction F. Since the roller 31 of the scanning head 4 smoothly rides onto the frame member 6 of the original retention plate 3 without creating any shock, vibration in the interior of the scanning head 4 that might disturb the image and reduction in the durability of the head by shock or noise are prevented. To enhance the above-described effect by making the slope of the sloped surface 29' gentler, the frame member 6 may be grooved up to the portion subsequent to the entrance portion 29' of the guide path 29, namely, up to the point whereat the scanning of the original is terminated, thereby making the height of the guide path 29 lower.

What we claim is:

1. An original reading device including:

an original table for supporting thereon an original with its surface to be read facing upward;

original keep means for pressing against the surface to be read for holding the original on said original table, the area of said original keep means which is urged against the surface to be read being a transparent plate, said original keep means defining a guide path along a predetermined direction, said original keep means being vertically movable so that the level thereof when pressing against the surface to be read is variable in accordance with the thickness of the original; and scanning means opposed to the surface to be read with said transparent plate being interposed therebetween, said scanning means having photoelectric converter means and a lens for forming an image of the surface to be read on said photoelectric converter means, said scanning means being movable in said predetermined direction to scan the original and being vertically movable, said scanning means having a spacer portion bearing against said guide path defined in said original keep means to maintain the length of the optical path between said lens and the surface to be read constant even when the level of said original keep means with respect to the surface to be read varies, wherein said spacer portion of said scanning means starts to move forward in said predetermined direction from a position displaced from said guide path, and the entrance portion of said guide path is formed into a sloped surface which becomes gradually higher in the direction of forward movement of said spacer portion.

2. The device according to claim 1, further including:

a support shaft for pivotably supporting said original keep means to enable said original keep means to be moved between an open and a closed position relative to said original table, said original keep means being urged against the surface to be read of the original when in said closed position relative to said original table; and shaft supporting means for supporting said support shaft in such a manner as to make said support shaft vertically movable in accordance with the thickness of the original.

3. The device according to claim 1, further including:

a support shaft for pivotably supporting said original keep means to enable said original keep means to be moved between an open and a closed position relative to said original table, said original keep means being urged against the surface to be read of the original when in said closed relative to said original table, said original keep means being engaged with said support shaft so as to be vertically movable in accordance with the thickness of the original.

4. The device according to any one of claims 1, 2 and 3, further including:

a guide rail provided along said predetermined direction, said scanning means being engaged with said guide rail; and rail supporting means for supporting said guide rail to make said guide rail vertically movable in accordance with the thickness of the original.

5. The device according to claim 4, wherein said original table has an original supporting surface that is vertically movable.

6. The device according to claim 5, wherein said original table is of an elastic material.

7. The device according to any of claims 1, 2 and 3, further including:

a guide rail provided along said predetermined direction, said scanning means being engaged with said guide rail so as to be vertically movable in accordance with the thickness of the original.

8. The device according to claim 7, wherein said original table has an original supporting surface that is vertically movable.

9. The device according to claim 8, wherein said original table is of an elastic material.

10. The device according to any one of claims 1, 2 and 3, wherein said original table has an original supporting surface that is vertically movable.

11. The device according to any one of claims 1, 2 and 3, wherein said original table is of an elastic material.

12. An original reading device comprising:

an original table for supporting thereon an original with its surface to be read facing upward;

original pressing means for pressing the original to hold the original on said original table, said original pressing means having a transparent plate for urging against the surface to be read and defining a guide path along a predetermined direction;

first supporting means for supporting said original pressing means to be openable from and closable against said original table and vertically movable in accordance with the thickness of the original;

scanning means opposed to the surface to be read and spaced therefrom by said transparent plate, said scanning means having photoelectric converter means and a lens for forming an image of the surface to be read on said photoelectric converter means, said scanning means being movable in said predetermined direction to scan the original; and second supporting means for supporting said scanning means to be movable in said predetermined direction and to be vertically movable in accordance with the thickness of the original independently of said original pressing means;

said scanning means having a spacer portion bearing against said guide path for maintaining the length of the optical path between said lens and the surface to be read constant even when the level of the transparent plate varies, and said scanning means initiating the forward movement in said predetermined direction from a home position in which said spacer portion is spaced from said original pressing means, and said spacer means riding along said guide path of said original means after said scanning means has commenced the forward movement.

13. The device according to claim 12, said first support means including:

a support shaft for pivotably supporting said original pressing means; and shaft supporting means for supporting said support shaft to be vertically movable in accordance with the thickness of the original.

14. The device according to claim 12, said first support means including a support shaft for pivotably supporting said original pressing means, and said original pressing means being engaged with said support shaft so as to be vertically movable in accordance with the thickness of the original.

15. The device according to claim 12, said second support means including:

a guide rail provided along said predetermined direction, said scanning means being engaged with said guide rail; and rail supporting means for supporting said guide rail to be vertically movable in accordance with the thickness of the original.

16. The device according to claim 12, said second support means including a guide rail provided along said predetermined direction, said scanning means being engaged with said guide rail so as to be vertically movable in accordance with the thickness of the original.

17. The device according to any one of claims 12 to 16, wherein said original table has an original supporting surface that is vertically movable.

18. The device according to any one of claims 12 to 16, wherein said original table is of an elastic material.

* * * * *

UNITED STATES PATENT AND TRADEMARK OFFICE
CERTIFICATE OF CORRECTION

PATENT NO. : 4,486,786

DATED : December 4, 1984

INVENTOR(S) : Tadashi Sato, Et al.

It is certified that error appears in the above-identified patent and that said Letters Patent is hereby corrected as shown below:

Column 3, line 53, "1728" should begin a new line; and "3456" should begin a new line.

Signed and Sealed this

Eleventh Day of June 1985

[SEAL]

Attest:

DONALD J. QUIGG

Attesting Officer — Acting Commissioner of Patents and Trademarks